United States Patent Office 3,564,827
Patented Feb. 23, 1971

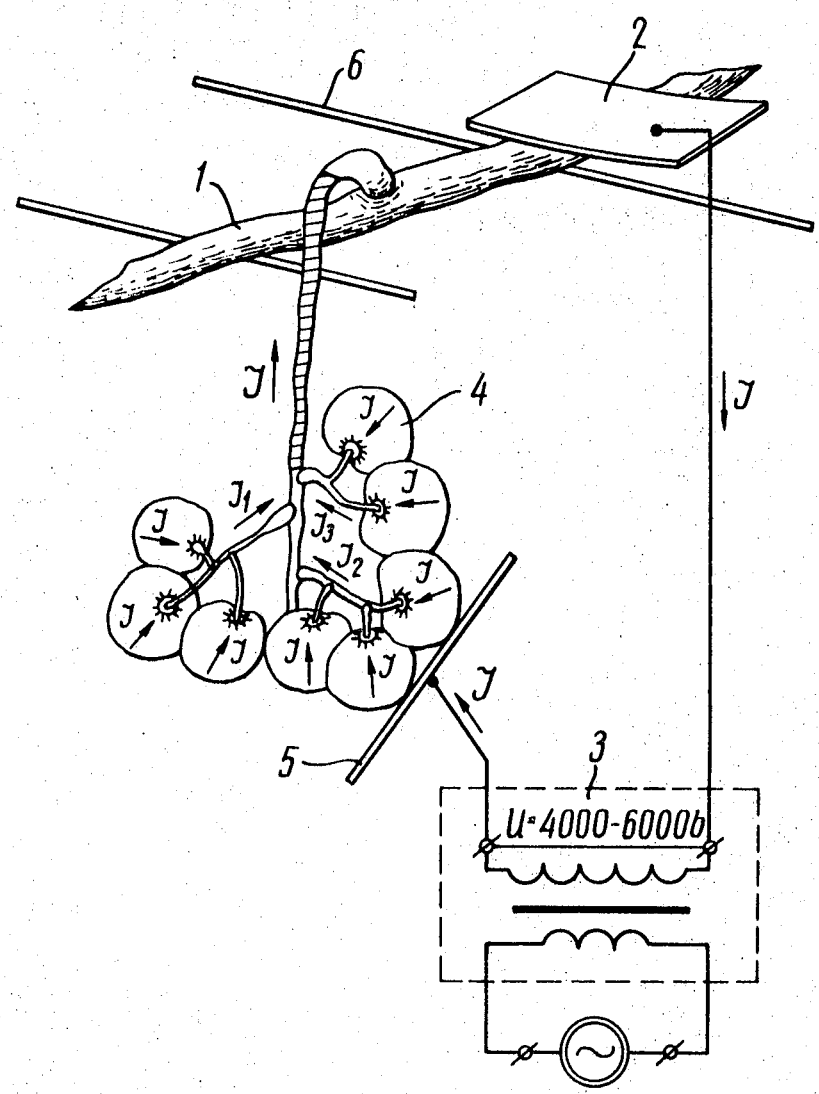

3,564,827
METHOD AND APPARATUS FOR HARVESTING GRAPES
Alexandr Mikhailovich Negrul, Ul. Novo-Peschanaya 23, kv. 300, Moscow, U.S.S.R.; and Josif Andreevich Stojushkin, Ljuberetsky raion, Pos. Kosino 37, kv. 88; Vladimir Nikolaevich Osminkin, Ljuberetsky raion, Pos. Kosino 37, kv. 80; and Jury Lvovich Breshkov, Ljuberetsky raion, Pos. Kosino 37, kv. 23, all of Moskovskaya Oblast, U.S.S.R.
Filed Apr. 25, 1969, Ser. No. 819,196
Int. Cl. A01g *19/00*
U.S. Cl. 56—331                                      2 Claims

ABSTRACT OF THE DISCLOSURE

A method of harvesting fruit, for example grapes, wherein the fruit are severed from the spurs by burning up the fruit stems due to the difference in the ohmic resistance of the spur, fruit and its stem, and a device for its realization consisting of a source of electrical power and two spaced plates connected thereto, one being adapted to contact a spur, the other being adapted to contact the depending fruit with the result that an electrical current will pass from one plate through the fruit, stem and spur to the other plate and in the process the stem will burn thus separating the fruit from the spur.

The present invention relates to agricultural machines and more particularly it relates to methods of harvesting fruit and to devices for their realization when fruit-bearing plants are cultivated on horizontal and inclined trellises.

Known in the art is a method of severing the fruit of citrus plants by connecting the plant to an electric circuit.

This method consists in intensifying, by the electric current, the phenomenon of osmosis which speeds up the nutrition, ripening of the fruit and their natural falling off.

A disadvantage of the known method lies in the complexity of its practical realization in case of a 100 percent harvesting of fruit.

An object of the present invention is to provide a method of harvesting fruit, for example grapes, and a device for its realization which will ensure a 100 percent harvesting within a short period of time without the use of manual labor.

This and other objects have been accomplished by providing a method of harvesting fruit, e.g. grapes by connecting the fruit spur and the fruit proper to an electric circuit and severing the fruit from the spur in which, according to the invention, the electric current is fed to the spur and fruit for burning-up the fruit stems, owing to a difference in the ohmic resistance of the spur, fruit and fruit stem.

Additionally, in the device for the realization of this method, according to the invention, the spur and the fruit are connected to the electric circuit by means of two movable contact plates one of which comes in contact with the trellis and the fruit-bearing spurs, while the other one touches the depending fruit.

The application of the method and the device for its realization increases the productivity 80 to 100 times as compared to manual picking while harvesting, say, grapes.

Now the invention will be described in detail by way of example with reference to the accompanying drawing the sole figure of which illustrates a simplified perspective view of the device according to the invention.

In the method the fruit is harvested by an electric-contact method which consists in burning up the fruit stems with an electric current. The grape clusters and other fruit containing water solutions of sugar and acids are highly conductive. From the standpoint of their anatomy, the fruit stems are bunches of a vascular-and-fibrous structure with a relatively low moisture content and offer, therefore, a higher ohmic resistance.

While the electric current of certain parameters flows through a fruit-stem-spur circuit, a certain amount of heat is produced which burns up the fruit stem.

It has been established that the heat required for burning the stems of the grape clusters is produced at a current of about 0.03 A. and a voltage ranging from 4000 to 10,000 v. In such a case the burning-up speed varies from 0.3 to 1 second, depending on the voltage, anatomy of the cluster stem, its diameter and moisture content.

A plate 2 connected to a source 3 of high-voltage current is brought into contact with the fruit-bearing grapevine.

Simultaneously, another contact plate 5 likewise connected to the source of current 3 is brought into contact with the grape cluster 4.

A roller may be substituted for the plate 2 to perform the identical function of contacting the grapevine.

At the moment when the plate 2 touches the grapevine and the plate 5 touches the cluster, the electric circuit is closed thus producing a short-circuit which burns up the cluster stem, and severs the clusters without damaging them.

What we claim is:
1. A method of harvesting fruit, such as, grapes, consisting of passing an electric current through the fruit, stems and spurs which serves to sever the fruit from the spurs by the burning of the stems that occurs due to a difference of the ohmic resistances of the spur, fruit and its stem.

2. A device for harvesting fruit, such as grapes, from the vines comprising a contact plate which, while moving, is adapted to contact the trellis supported fruit-bearing spurs; another contact plate which while also moving is adapted to contact depending fruit, and a source of current to which both of said contact plates are connected to pass an electric current through the fruit, stems and spurs which serves to sever the fruit from the spurs by the burning of the stems only.

References Cited
UNITED STATES PATENTS

| | | | |
|---|---|---|---|
| 855,389 | 5/1907 | Dawkins | 47—1.3X |
| 2,607,165 | 8/1952 | Rainey | 47—1.3 |
| 2,632,285 | 3/1953 | McCreight et al. | 47—1.3 |
| 3,183,650 | 5/1965 | Ferris | 56—25 |

RUSSELL R. KINSEY, Primary Examiner

U.S. Cl. X.R.

47—1.3